Jan. 26, 1937.  J. P. JOHNSON  2,068,803
VACUUM PUMP
Filed March 14, 1935
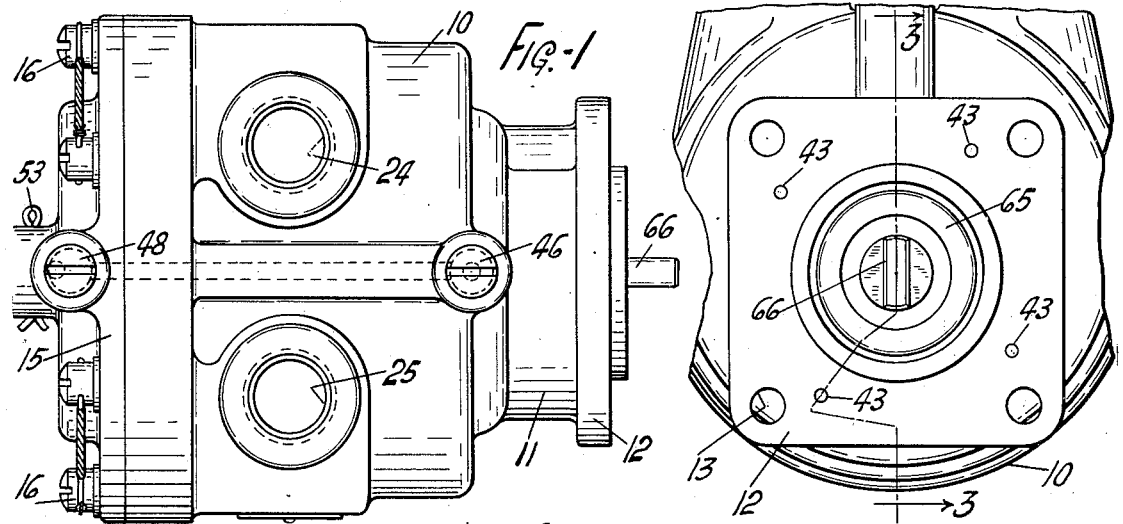
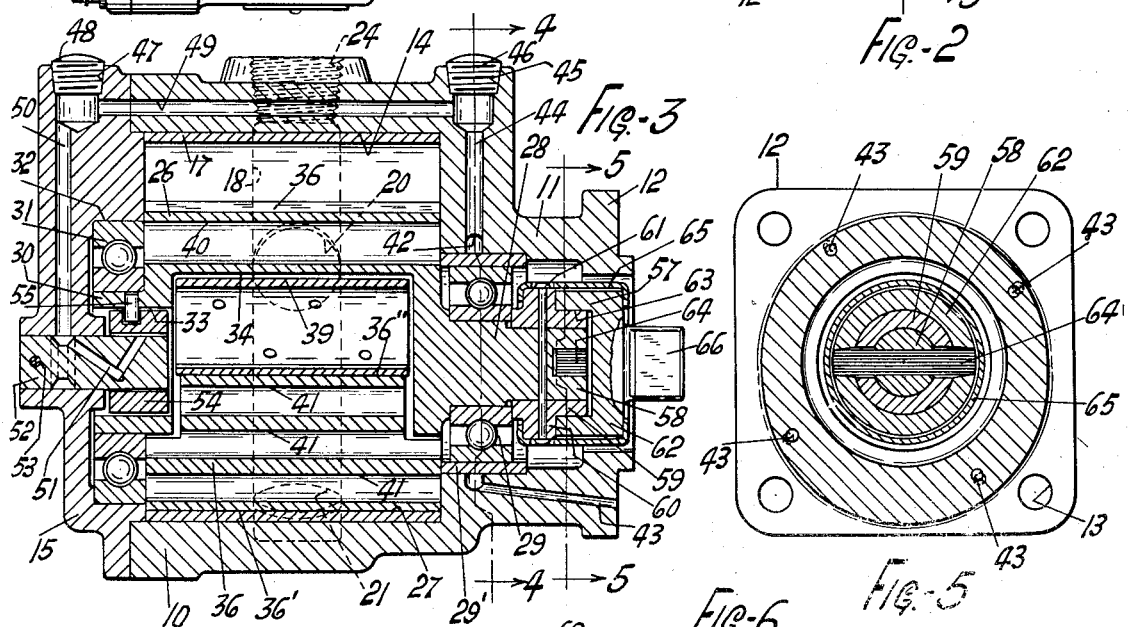
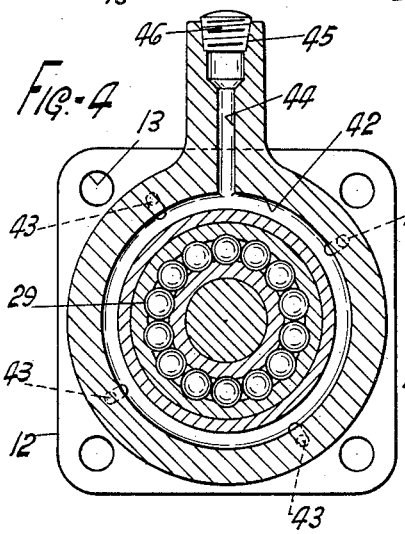
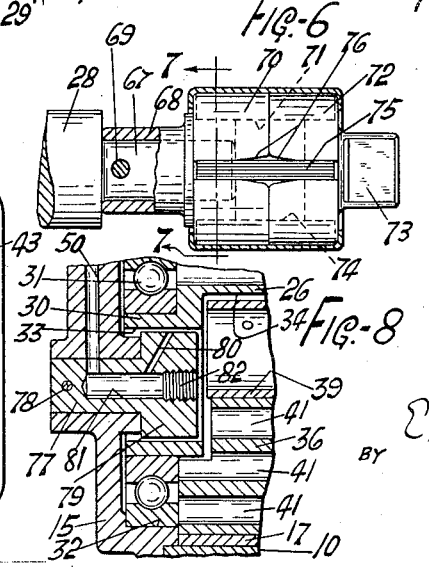
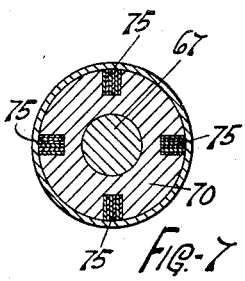
INVENTOR
JAMES P. JOHNSON
BY E. Melbourne Green
ATTORNEY Patented Jan. 26, 1937

2,068,803

UNITED STATES PATENT OFFICE 2,068,803

VACUUM PUMP

James P. Johnson, Shaker Heights, Ohio

Application March 14, 1935, Serial No. 10,994

9 Claims. (Cl. 230—207)

This invention relates to a rotary pump of the vane or blade type in which the rotor is eccentrically mounted with respect to the chamber within which it rotates, and has for its primary object to provide an improved pump of this type which is simple and compact in construction, efficient in operation and inexpensive to manufacture.

The pump embodying the present invention is designed for use on aircraft for creating the necessary pressure required in the operation of the various instruments and gauges, and as this type of pump must be of the highest degree of efficiency and at the same time of light weight and compactness it is a further object to provide an improved pressure lubricating means for the high speed movable parts which increases the efficiency of the pump and reduces the noise of operation to a minimum.

A further object of the invention resides in providing a flexible driving means between the power drive from the aircraft motor to the rotor of the pump which further reduces the operating noise to a minimum and additionally any tendency toward crystallization of the parts of the driving connection which might otherwise break during operation.

With the objects above indicated and other objects hereinafter explained in view, the invention consists in the construction and combination of elements hereinafter described and claimed.

Referring to the drawing,

Figure 1 is a top plan view of a rotary pump embodying the present invention;

Figure 2 is an end elevational view of the same;

Figure 3 is a vertical longitudinal sectional view taken on line 3—3 in Figure 2;

Figure 4 is a transverse sectional view taken on line 4—4 in Figure 3;

Figure 5 is a transverse sectional view taken on line 5—5 in Figure 3;

Figure 6 is a vertical longitudinal sectional view of a modified form of flexible coupling embodying the present invention;

Figure 7 is a transverse sectional view taken on line 7—7 in Figure 6;

Figure 8 is a fragmentary sectional view of a modified form of lubricant discharge arrangement.

In the drawing a full size pump is illustrated which has been designed especially for use in aircraft and is of the vacuum or reduced pressure type employed in connection with the operation of various types of instruments and gauges required in connection with flying. As the present invention is an improvement in the pump described and claimed in my copending application Serial No. 722,155, filed April 24, 1934, reference may be had thereto for a more detailed disclosure of the specific construction if the accompanying drawing does not suffice.

Inasmuch as the rotor is operated at one and one-half times the engine speed in actual use and tested at speeds up to 5000 R. P. M., ordinary lubrication is impracticable and the present system has therefore been designed to effectively lubricate the relatively movable parts as well as to control the amount of lubricant delivered thereto.

In the drawing, 10 indicates generally a housing, preferably of aluminum or some similar light-weight material, which is open at one end and closed at the opposite end. At the closed end of the housing 10 an axial extension 11 is provided, preferably formed integral with the housing, and at the free end of the extension is a laterally extending flange 12, more clearly shown in Figure 2, having openings 13 provided therein by which the housing may be suitably attached to a portion of the plane. The housing 10 is provided with a circular bore 14 extending inwardly from the open end thereof and a cover plate 15 is detachably connected to the housing adjacent the open end by means of bolts 16, more clearly shown in Figure 1. This cover plate 15 not only serves the purpose of closing the open end of the housing 10, but additionally functions as one of the end walls of the circular bore 14, the closed end of the housing functioning as the other end wall.

A tubular sleeve 17, preferably of hard cast iron, is secured within the circular bore 14 of the housing and has its inner end abutting the closed end of the housing while its opposite end is engaged by the cover plate 15, as clearly shown in Figure 3. The housing 10 is provided with passageways of identical area disposed on diametrically opposite sides of the housing, only one passageway 18 being shown. The sleeve 17 is provided with spaced transverse openings 20 and 21 communicating with the passageway 18 at its extremities, while similar spaced transverse openings are provided in the opposite side of the sleeve in communication with the other pasageway. These pairs of openings are provided in the sleeve 17 so that the pump may be operated in opposite directions without requiring any readjustment of the operating parts. At the upper portion of the housing 10 screw-threaded openings 24 and 25 are provided which communicate respectively with the passageway 18 and the other passageway, not shown, to permit the pump to be properly connected with the various instruments in a manner well understood and depending upon the direction of rotation of the pump.

A rotor 26, preferably made of hardened steel, is eccentrically positioned within the sleeve 17 and has a running engagement with the inner surface of the sleeve at 27. The rotor, of course, is coextensive with the sleeve 17 as shown in Figure 3. One end of the rotor 26 is provided with an axial extension 28, preferably formed integral therewith, and which is anti-frictionally supported in a ball bearing race 29, contained in a metal sleeve 29' mounted in the extension 11 of the housing. The opposite end of the rotor 26 is also provided with an axial extension 30 preferably formed integral therewith and which is likewise anti-frictionally supported in a ball bearing race 31 contained in a recessed portion 32 provided on the inner side of the cover plate 15. The extension 30 is provided with an axial opening 33, which communicates with an axial bore 34 of larger diameter provided in the rotor 26 for a purpose to be later described, the longitudinal length of the bore 34, however, being slightly less than the longitudinal length of the rotor 26.

The rotor 26 is provided with a plurality of radially disposed slots which extend through the wall thereof and throughout its length there being in this particular construction four of such slots employed, although various numbers may be employed, depending upon the volume of the pump.

Blades 36, preferably of heat-treated aluminum alloy, are disposed in the slots of the rotor 26 and have a sliding fit therein. These blades are substantially T-shaped in longitudinal section as shown in Figure 3 and have their opposite longitudinal surfaces formed arcuate. The outer longitudinal surface 36' contacts the inner peripheral surface of the sleeve 17 as the rotor 26 is rotated due to the centrifugal action while the inner longitudinal surface 36" engages a hollow cylindrical roller member 39 to maintain the blades in proper spaced relation. The roller member 39 is normally disposed within the bore 34, the opening 33 in the extension 30 of the rotor being of sufficient diameter to permit the insertion of the roller member therethrough so as to properly position the roller member in the bore 34 and due to the fact that the diameter of the bore 34 is larger than the diameter of the opening 33, the roller member 39 is prevented from accidental displacement and any appreciable longitudinal movement within the bore 34. At the same time the roller member 39 is readily removable and replaceable in case of excessive wear or injury.

The rotor 26 is provided with a plurality of longitudinally extending openings 40 in the walls thereof between the slots for lightening as much as possible the weight of the rotor. Likewise the blades 36 are provided with a plurality of longitudinally extending openings 41 for lightening the weight thereof. So much of the construction is disclosed in the aforesaid copending application.

To provide proper and suitable lubrication for the relatively movable parts of the high speed rotor, it is desirable that the lubricant be supplied substantially continuously under pressure. This is effectively obtained in the present instance by providing a circumferential groove 42 on the inner surface of the extension 11 as shown in Figure 3. This groove is turned in any suitable manner before the sleeve 29' is secured in position and the latter cooperates therewith to provide an endless circular passageway. A laterally extending opening 43 is provided in the extension 11 and has its inner end communicating with the groove 42, the outer end being adapted to communicate with the pressure oiling system of the engine through the medium of the engine pad to which the pump is connected by the flange 12. A plurality of such openings 43 are provided in the extension 11 as shown more clearly in Figure 5 so that the pump housing may be angularly adjusted about its axis to properly align one of the openings 43 with the opening in the engine pad, the latter being in engagement with the end surface of the flange when assembled which thereby closes the outer ends of the other openings not in use.

An opening 44 extends upwardly from the groove 42 through the housing 10 and terminates in connection with a screw-threaded opening 45 normally closed by a removable screw threaded plug 46. A second screw-threaded opening 47 is provided in the upper portion of the cover plate 15 and is normally closed by a removable screw-threaded plug 48. A longitudinally extending opening 49 connects the screw-threaded openings 45 and 47 at a point beneath the plugs so that the opening 49 is in communication with the vertical opening 44. Extending downwardly from the screw-threaded opening 47 in the cover 15 is an opening 50 which communicates with a circumferential groove provided in a hardened steel discharge member 52. This discharge member has its outer end fitting snugly in an axial opening provided in the cover plate 15 and is secured against accidental displacement by means of a removable cotter pin 53. A pair of angularly disposed communicating openings are drilled in the discharge member to provide a passageway 51 communicating with the circumferential groove and the outer surface of the inner end of the discharge member through which a lubricant may pass.

A bronze sleeve 54 is positioned loosely within the axial opening 33 and is secured to rotate with the rotor by means of a pin 55 having a drop fit in aligned openings in the extension 30 and the sleeve 54. The pin 55 is positioned so as to underlie the inner race of the bearing 31 which prevents accidental disengagement. The sleeve 54 further encircles the inner end of the discharge member 52 and is provided with a predetermined clearance which controls the amount of lubricant discharged from the inner end of the passageway 51. By varying the clearance between the outer surface of the discharge member 52 and the adjacent inner peripheral surface of the sleeve 54 or by varying the size of the passageway 51, or both, the rate at which the lubricant can be discharged is controlled and therefore the amount of lubricant reaching the relatively movable parts.

It will also be noted that the lubricant is discharged into the interior of the rotor, preferably into the roller member 39 which being provided with transverse openings permits the lubricant to be forced outwardly by centrifugal action.

In the modification shown in Figure 8, a discharge plug 77, preferably of bronze material, has a circular body portion fitting snugly in an axial opening provided in the cover plate 15 and is secured against accidental displacement by means of a removable cotter pin 78. The inner end of the plug 77 has an enlarged circular portion 79 which is disposed axially within the opening 33 in the extension 30, and also is provided with an angularly extending opening 80 communicating with a bore 81 through which the lubricant passes. The inner end of the bore 81 is screw-threaded to receive a plug 82 which after being screwed tightly into place is soldered or otherwise secured against removal. By varying the diameter of the inner portion 79 of the plug with respect to the inner periphery of the adjacent extension or the size of the opening 80 or both, the rate at which the lubricant can be discharged is controlled and therefore the amount of lubricant reaching the relatively movable parts. Also different plugs may be substituted until the proper one is found which gives the desired result.

When the pump is operating the oil from the engine is forced through one of the openings 43 into the circular groove 42, then upwardly through the opening 44, through the opening 49, downwardly through the opening 50 into the circumferential groove, and outwardly through the passageway 51 into engagement with the adjacent inner peripheral surface of the sleeve 54. Because of the high speed at which the rotor rotates, the oil or other lubricant discharged under pressure from the passageway 51 is caused by centrifugal action to flow outwardly and ultimately produce a thin skin of oil or lubricant between the relatively movable parts. Too much lubricant will interfere with the efficient operation of the pump and too little lubricant will cause noise and excessive wear of the relatively movable parts resulting in reduced efficiency and possible damages.

The proper amount of lubricant can be determined and then by providing the proper clearance between the outer surface of the member 52 and the adjacent inner periphery of the sleeve 54, or by providing the proper size passageway 51, or both, the rate at which the oil or lubricant is discharged can be controlled so that the relatively movable parts will receive the proper amount of oil or lubricant thereby reducing the noise and increasing the efficiency of the pump.

The plugs 46 and 48 are provided so that oil or lubricant may be supplied under pressure from a different source than through the openings 43, a suitable connection being made with either of the cooperating openings.

To further obtain quietness and to eliminate the possibility of breakage of the driving connection or coupling between the driving means and rotor usually caused from the crystallization of the parts of the coupling, a flexible coupling 57 is provided, as shown in Figures 3 and 5. The extension 28 on the rotor 26 has an outer end 58 of slightly reduced diameter extending beyond the bearing 29. A sleeve member 59 is mounted upon the outer end 58 and has a laterally extending flange 60 formed integral therewith. Transversely aligned openings are provided in the sleeve 59 and outer end 58 to receive a pin 61, the opposite ends of which are offset to prevent disengagement and to secure the members for rotation in unison. The inner race of the bearing 29 is also secured against displacement due to engagement by the inner end of the sleeve 59.

A circular member 62 has a diameter slightly less than the diameter of the flange 60 and is provided with an axial bore 63 to receive the adjacent end of the sleeve 59 and upon which it is freely mounted. The inner end of the cylindrical member 62 engages the adjacent surface of the flange 60 in such a manner as to provide a clearance between the end of the outer end 58 and the bottom of the bore 63. Transversely aligned grooves are provided in the ends of the outer end 58, sleeve 59 and circular member 62 which receive a resilient member 64 in the present instance a plurality of flat spring steel members. This arrangement permits a limited amount of relative angular movement between the circular member 62 and the sleeve 59 secured to the rotor 26, thus providing a flexible connection with the power driving means.

A retainer member 65 is placed over the circular member 62 and the flange 60 and spun downwardly behind the latter to secure the same in place. An opening is provided in the end of the extension 11 through which the coupling extends and a flat sided extension 66 is formed on the outer end of the circular member 62 for connection with the driving means from the engine.

A modified form of coupling is shown in Figures 6 and 7 which preferably is for use with pumps of larger capacity than the one illustrated in the drawing. In this construction the extension 28 of the rotor 26 has a reduced end portion 67 upon which a sleeve 68 is mounted and is secured thereto by means of a pin or rivet 69. The outer end of the sleeve has an enlarged circular head 70 preferably formed integral therewith and provided with an axial bore 71 which communicates with the opening for the end portion 67. A circular member 72 of slightly less diameter than the head 70 is positioned in axial alignment therewith and has a flat sided extension 73 formed integral at the outer end thereof for connection with the driving means from the engine.

The circular member 72 has an axial bore 74 in alignment with the bore 71 in the head 70 and these members are relatively movable angularly. Longitudinally extending aligned grooves are provided in the head 70 and circular member 72 respectively within which a resilient connecting means 75 is mounted, in the present instance being composed of a plurality of flat flexible spring steel elements which provide a flexible coupling. The corners of the head and circular member adjacent the resilient connecting means are slightly rounded at 76 to permit relative angular movement in opposite directions. Four of these resilient connecting means are herein illustrated, but the number may be varied to suit the conditions. These spring elements also extend substantially parallel with the axis of the members as distinguished from the transverse arrangement shown in Figure 5.

While I have described the preferred embodiment of the invention it is to be understood that I am not to be limited thereto inasmuch as changes and modifications may be resorted to without departing from the spirit of the invention as defined in the appended claims.

What is claimed is:

1. A pump of the character described comprising a housing having a circular chamber therein extending inwardly from one end thereof, said housing being further provided with inlet and outlet passageways communicating with said chamber, a cover plate removably connected to said housing for closing the end thereof, a rotor eccentrically positioned in said chamber and having axial extensions rotatably mounted in said housing and cover plate respectively, radially disposed blades slidably supported in said rotor and having their outer ends adapted for engagement with the inner peripheral wall of said chamber, the rotor extension which is mounted in said cover plate having an axial opening communicating with an axial bore of larger diameter provided in said rotor, a cylindrical roller member loosely disposed within the bore of said rotor and adapted to engage the inner ends of said blades to maintain the latter in spaced relation, a sleeve disposed within the axial opening and connected to the adjacent extension for rotation therewith, and a discharge member having one end secured to said cover plate and its opposite end disposed within said sleeve, said member having a lubricant discharge passageway therein, with its discharge opening adjacent the inside of said sleeve and between the ends thereof, said cover plate and housing being provided with lubricant passageways communicating with the discharge passageway in said discharge member and adapted to receive a lubricant under pressure.

2. A pump of the character described comprising a housing having a circular chamber therein extending inwardly from one end thereof, said housing being further provided with inlet and outlet passageways communicating with said chamber, a cover plate removably connected to said housing for closing the end thereof, a rotor eccentrically positioned in said chamber and having axial extensions rotatably mounted in said housing and cover plate respectively, radially disposed blades slidably supported in said rotor and having their outer ends adapted for engagement with the inner peripheral wall of said chamber, the rotor extension which is mounted in said cover plate having an axial opening communicating with an axial bore of larger diameter provided in said rotor, a cylindrical roller member loosely disposed within the bore of said rotor and adapted to engage the inner ends of said blades to maintain the latter in spaced relation, a sleeve disposed within the axial opening and connected to the adjacent extension for rotation therewith, and a discharge member having one end removably connected to said cover plate and its opposite end disposed within said sleeve, said member having a lubricant discharge passageway therein with its discharge opening adjacent the inside of said sleeve and between the ends thereof, said cover plate and housing being provided with lubricant passageways communicating with the discharge passageway in said discharge member and adapted to receive a lubricant under pressure.

3. A pump of the character described comprising a housing having a circular chamber therein extending inwardly from one end thereof, said housing being further provided with inlet and outlet passageways communicating with said chamber, a cover plate removably connected to said housing for closing the end thereof, a rotor eccentrically positioned in said chamber and having axial extensions rotatably mounted in said housing and cover plate respectively, radially disposed blades slidably supported in said rotor and having their outer ends adapted for engagement with the inner peripheral wall of said chamber, the rotor extension which is mounted in said cover plate having an axial opening communicating with an axial bore of larger diameter provided in said rotor, a cylindrical roller member loosely disposed within the bore of said rotor and adapted to engage the inner ends of said blades to maintain the latter in spaced relation, a sleeve disposed within the axial opening and connected to the adjacent extension for rotation therewith, and a discharge member having one end removably connected to said cover plate and its opposite end disposed within said sleeve, said member having a lubricant discharge passageway therein with its discharge opening adjacent the inside of said sleeve and between the ends thereof and a circumferential groove communicating with the outer end of the discharge passageway, said cover plate and housing being provided with a lubricant passageway communicating with the circumferential groove on said discharge member and adapted to receive a lubricant under pressure.

4. A pump of the character described comprising a housing having a circular chamber therein extending inwardly from one end thereof, said housing being further provided with inlet and outlet passageways communicating with said chamber, a cover plate removably connected to said housing for closing the end thereof, a rotor eccentrically positioned in said chamber and having axial extensions, anti-friction bearings supported in said cover plate and housing respectively and adapted to rotatably receive said extensions, radially disposed blades slidably supported in said rotor and having their outer ends adapted for engagement with the inner peripheral wall of said chamber, the rotor extension which is mounted in said cover plate having an axial opening communicating with an axial bore of larger diameter provided in said rotor, a cylindrical roller member loosely disposed within the bore of said rotor and adapted to engage the inner ends of said blades to maintain the latter in spaced relation, a sleeve disposed within the axial opening in said extension, a pin connecting said sleeve with the adjacent extension for rotation therewith, said pin being disposed within the inner race of the adjacent bearing to prevent accidental disengagement thereof, and a discharge member having one end secured to said cover plate and its opposite end disposed within said sleeve, said member having a lubricant discharge passageway therein with its discharge opening adjacent the inside of said sleeve and between the ends thereof, said cover plate and housing being provided with lubricant passageways communicating with the discharge passageway in said discharge member and adapted to receive a lubricant under pressure.

5. A pump of the character described comprising a housing provided with inlet and outlet passageways, a rotor having axial extensions rotatably mounted in said housing, one of said extensions having an axial opening, a sleeve disposed within the axial opening and connected to the adjacent extension for rotation therewith, and a discharge member having one end secured to said housing and its opposite end disposed within said sleeve, said member having a lubricant discharge passageway therein with its discharge opening adjacent the inside of said sleeve and between the ends thereof, said housing being provided with lubricant passageways communicating with the passageway in said discharge member and adapted to receive a lubricant under pressure.

6. A pump of the character described comprising a housing provided with inlet and outlet passageways, a rotor having axial extensions rotatably mounted in said housing, one of said extensions having an axial opening, a sleeve disposed within the axial opening and connected to the adjacent extension for rotation therewith, a discharge member having one end removably connected to said housing and its opposite end disposed within said sleeve, said member having a lubricant discharge passageway therein with its discharge opening adjacent the inside of said sleeve and between the ends thereof, said housing being provided with lubricant passageways communicating with the passageway in said discharge member and adapted to receive a lubricant under pressure.

7. A pump of the character described comprising a housing provided with inlet and outlet passageways, a rotor having axial extensions rotatably mounted in said housing, one of said extensions having an axial opening, a sleeve disposed within the axial opening and connected to the adjacent extension for rotation therewith, a discharge member having one end removably connected to said housing and its opposite end disposed within said sleeve, said member having a lubricant discharge passageway therein with its discharge opening adjacent the inside of said sleeve and between the ends thereof and a circumferential groove communicating with the outer end of said discharge passageway, said housing being provided with a lubricant passageway communicating with said circumferential groove on said discharge member and adapted to receive a lubricant under pressure.

8. A pump of the character described comprising a housing provided with inlet and outlet passageways, a rotor having axial extensions rotatably mounted in anti-friction bearings in said housing, one of said extensions having an axial opening, a sleeve disposed within the axial opening in said extension, a pin connecting said sleeve with the adjacent extension for rotation therewith, said pin being disposed within the inner race of the adjacent bearing to prevent accidental disengagement thereof, and a discharge member having one end secured to said housing and its opposite end disposed within said sleeve, said member having a lubricant discharge passageway therein with its discharge opening adjacent the inside of said sleeve and between the ends thereof, said housing being provided with lubricant passageways communicating with the passageway in said discharge member and adapted to receive a lubricant under pressure.

9. A pump of the character described comprising a housing having inlet and outlet passageways and provided with an attaching flange by which said housing is removably connected to a container for lubricant, a rotor having axial extensions rotatably mounted in said housing, one of said extensions having a portion projecting through said attaching flange and adapted for connection with a drive means, the other of said extensions having an axial opening therein, a sleeve disposed within the axial opening and connected to the adjacent extension for rotation therewith, a discharge member having one end secured to said housing and its opposite end disposed within said sleeve, said member having a lubricant discharge passageway therein with its discharge opening adjacent the inside of said sleeve and between the ends thereof, said housing having a continuous groove adjacent said attaching flange which encircles the adjacent rotor extension and a passageway connecting said groove with said discharge member passageway, said housing being further provided with a plurality of independent passageways spaced angularly about the axis of said rotor and extending inwardly from said attaching flange into communication with said groove to adapt the housing for mounting in different angular positions whereby any one of said passageways may be placed in communication with lubricant under pressure within said container depending upon the position of mounting of said housing.

JAMES P. JOHNSON.